Aug. 30, 1932.  C. W. KANOLT  1,874,047
DEPTHOGRAPH PLATE HOLDER
Filed May 23, 1930  2 Sheets-Sheet 2

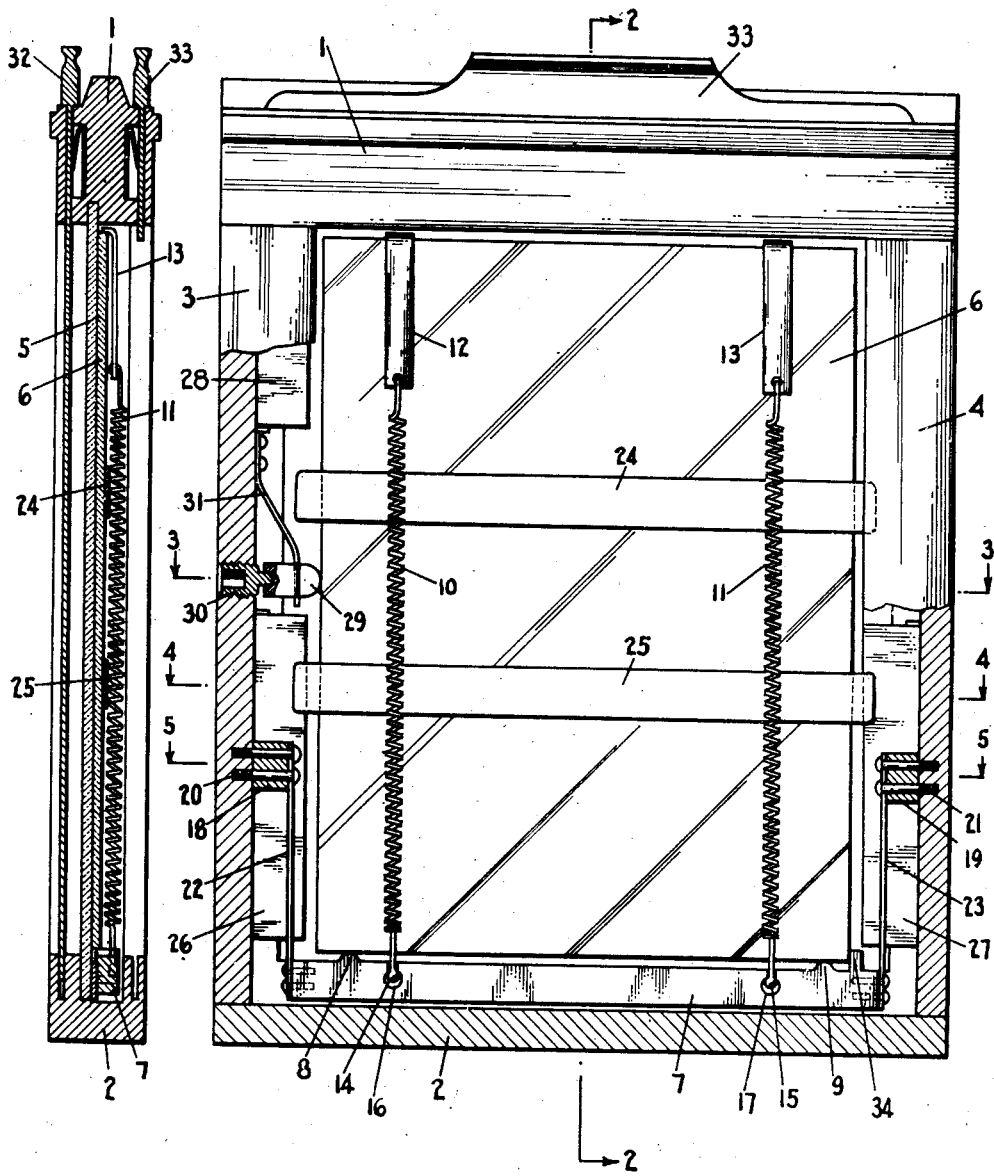

INVENTOR
Clarence W. Kanolt
BY
ATTORNEY

Patented Aug. 30, 1932

1,874,047

UNITED STATES PATENT OFFICE

CLARENCE W. KANOLT, OF NEW YORK, N. Y.

DEPTHOGRAPH PLATE HOLDER

Application filed May 23, 1930. Serial No. 454,861.

My invention relates to photographic apparatus, such as is described in my United States Letters Patent No. 1,260,662, issued March 26, 1918, in which I describe the taking of a stereoscopic picture by means of shifting the camera throughout an arc about the object being photographed, and at the same time continuously interposing a lined screen intermediate the sensitized plate and the lens of the camera.

In devices of this character, it is essential that the motion of the plate with relation to the lined screen be steady and free from jerks. It is also essential that the same rate of movement be imparted to the top of the plate as is imparted to the bottom thereof. These things are vital to the production of a satisfactory stereoscopic picture.

The object of my invention is, to provide a plate-holder in which the photographic plate is moved horizontally across a lined screen during the exposure, the distance through which the plate is moved being approximately the distance from one transparent line of the screen to the next. I have found in practice that if the attempt is made to slide the plate along a support that a large number of negatives are imperfect as the plate will move against excessive friction, and consequently, unsteadily and jerkily. This results from the fact that the edge of a glass sensitized plate is usually sharp and somewhat uneven. An important object of my device is to cause the plate to move smoothly and accurately. This I have accomplished by supporting it on a swinging bar hereinafter referred to.

I have employed the trade-mark "Depthograph", covered by certificate of registration No. 261,335, of September 17, 1929, as properly describing stereoscopic pictures produced by following the method described in my hereinbefore mentioned patent.

A concrete embodiment of my present invention is illustrated in the accompanying drawings, which are to be considered as a part of this specification, in which—

Fig. 1 is an elevation of a plate-holder embodying my improvement, partly broken away to show the interior construction;

Fig. 2 is a vertical sectional view of the holder shown in Fig. 1;

Similar reference numerals refer to similar parts throughout the entire description.

Figure 3:
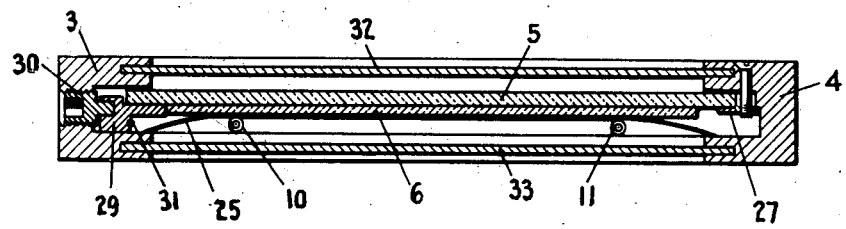
Fig. 3 is a cross-section, taken on line 3—3 in Fig. 1.
Figure 4:
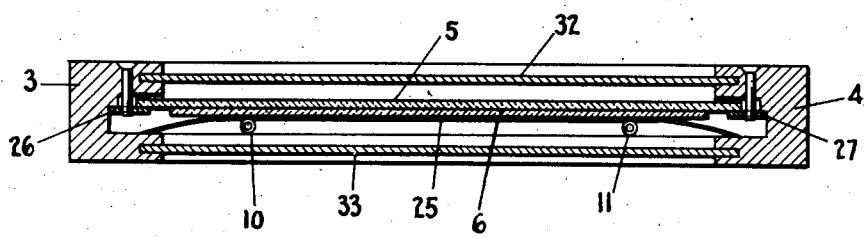
Fig. 4 is a cross-section, taken on line 4—4 in Fig. 1.
Figure 5:
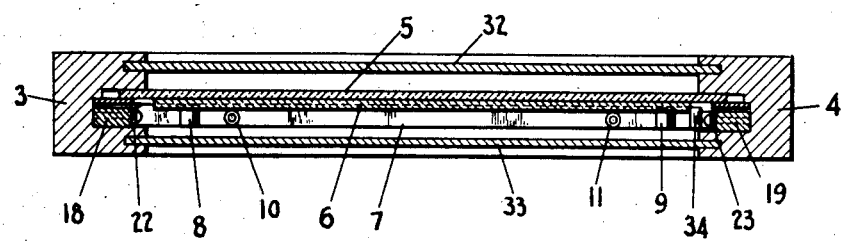
Fig. 5 is a cross-section, taken on line 5—5 in Fig. 1.

As shown in the drawings, my plate-holder comprises a frame having a top 1, bottom 2, and sides 3 and 4. In the frame is mounted a lined screen 5, of the type described in my Patent No. 1,260,682.

A photographic plate 6 is mounted in the plate-holder, with its face in contact with the lined screen 5. A bar 7 is mounted in the lower part of the plate-holder, and is provided with upwardly extending protuberances 8 and 9, on which the lower edge of the photographic plate 6 rests.

The photographic plate 6 is held in contact with the bar 7 by means of coil springs 10 and 11, the upper ends of which are secured to hooks 12 and 13, which extend over the top edge of the photographic plate 6. The lower ends of these springs 10 and 11 are provided with knobs 14 and 15, which are adapted to be inserted in sockets 16 and 17 formed in the bar 7, providing for the easy attachment or disengagement between the springs 10 and 11 and the bar 7. A detent 34 is formed on one end of the bar 7, which prevents the photographic plate 6 from sliding on said bar 7.

The bar 7 is secured in place by means of strips 22 and 23, formed of metal which is sufficiently flexible to permit the bar 7 to swing or move horizontally. These metal strips 22 and 23 are secured at their upper ends, by means of screws 20 and 21, to blocks 18 and 19, the screws 20 and 21 extending into the sides 3 and 4 of the plate-holder.

In order to press the photographic plate 6 tightly into contact with the lined screen 5, I provide a plurality of removable bow springs 24 and 25. As illustrated, these are two in number. The ends of these bow springs 24 and 25 are inserted into the edges of the sides 3 and 4 of the plate-holder. The lined screen 5 is held in place by means of clamping strips 26, 27 and 28.

The side 3 of the plate-holder carries the device for moving the plate 6, and must therefore be made of unyielding material, which will not yield as the mechanism for moving the plate 6 is operated, as if the side 3 of the plate-holder should bend, it would produce irregularity in the movement of the plate 6.

My means for moving the plate 6 comprises a pusher 29, which is carried by a screw 30. A spring 31 is provided to hold the pusher 29 against the screw 30 when there is no plate 6 in the plate-holder. The plate-holder is provided with opaque slides 32 and 33, of the usual construction.

In practice I have found it desirable to form the pitch of the screw 30 so that one turn of the screw 30 will be equal to the distance the plate 6 is to be moved, in order that a single turn of the screw 30 during the exposure will be all that is required. I do not describe the mechanism for rotating the screw 30, as obviously it forms no part of the construction of the plate-holder.

It is obvious from the hereinbefore contained description, that the same construction can be employed for a horizontal plate-holder.

Although I have described a specific form of mechanism for moving the photographic plate 6, it may in some cases be found desirable to move the lined screen 5 instead of the plate 6; and I therefore do not desire to be understood as limiting myself, in the broader aspect of my invention, to the specific construction shown and described except as such limitations may appear in the hereinafter appended claims.

Having described my invention, what I regard as new, and desire to obtain by Letters Patent of the United States, is:

1. A depthograph plate holder, having opaque means to shield the plate when in the holder, said holder comprising a frame having top, bottom and sides, a lined screen in said plate holder, means to hold said screen against movement, a photographic plate, spring means to hold said photographic plate against said lined screen, a laterally movable bar on which said plate is mounted, flexible means which carry said bar spring-actuated means to hold said plate on said bar, means at one side of said plate holder which engages one edge of said plate, and rotatable means to actuate said last named means to move said plate.

2. A depthograph plate holder, having opaque means to shield the plate when in the holder, said holder comprising a frame having top, bottom and sides, one of said sides being formed of unyielding material, a lined screen in said plate holder, means to hold said screen against movement, a photographic plate, spring means to hold said photographic plate against said lined screen, a laterally movable bar on which said plate is mounted, resilient means to support said bar, spring-actuated means to hold said plate on said bar, means at one side of said plate holder which engages one edge of said plate, and rotatable means to actuate said last named means to move said plate.

3. A depthograph plate holder, having opaque means to shield the plate when in the holder, said holder comprising a frame having top, bottom and sides, a lined screen in said plate holder, means to hold said screen against movement, a photographic plate, spring means to hold said photographic plate against said lined screen, a laterally movable bar swingingly supported on which said plate is mounted, spring-actuated means to hold said plate on said bar, a detent to prevent said plate moving longitudinally on said bar, means at one side of said plate holder which engages one edge of said plate, and rotatable means to actuate said last named means to move said plate and bar.

4. A depthograph plate holder, having opaque means to shield the plate when in the holder, said holder comprising a frame having top, bottom and sides, a lined screen in said plate holder, means to hold said screen against movement, a photographic plate, spring means to hold said photographic plate against said lined screen, a laterally movable bar on which said plate is mounted, a pair of flexible metal strips which support said bar, spring-actuated means to hold said plate on said bar, rotatable means at one side of said plate holder which engages one edge of said plate, and a spring to hold said plate-moving means in engagement with said rotatable means when the photographic plate is out of said holder.

5. A depthograph plate holder, having opaque means to shield the plate when in the holder, said holder comprising a frame having top, bottom and sides, one of said sides being formed of unyielding material, a lined screen in said plate holder, means to hold said screen against movement, a photographic plate, spring means to hold said photographic plate against said lined screen, a laterally movable bar on which said plate is mounted, resilient means to support said bar, spring-actuated means to hold said plate on said bar, means at one side of said plate holder which engages one edge of said plate, and rotatable means, mounted in the unyielding side of said plate holder, to actuate said last named means to move said plate.

6. A depthograph plate holder, having opaque means to shield the plate when in the holder, said holder comprising a frame having top, bottom and sides, one of said sides being formed of unyielding material, a lined screen in said plate holder, means to hold said screen against movement, a photographic plate, means to hold said photographic plate against said lined screen, a laterally movable bar on which said plate is mounted, there being sockets in said bar, plurality of coil springs which detachably engage the top of said plate, knobs on the lower ends of said springs fitted to said sockets, a pusher at one side of said plate holder which engages one edge of said plate, and a screw mounted in the unyielding side of said plate holder to actuate said pusher and move said plate.

7. In a depthograph plate holder having opaque means to shield the plate when in the holder, a lined screen in said holder, a sensitized plate and means to hold them in contact, a support for said plate yieldable means to hold said plate against movement on said support, and flexible supporting means for said plate support.

CLARENCE W. KANOLT.